(12) United States Patent
Fujie et al.

(10) Patent No.: US 7,675,744 B2
(45) Date of Patent: Mar. 9, 2010

(54) AIR DISTRIBUTION SYSTEM COMPATIBLE WITH DISPARATE DATA STORAGE SYSTEMS

(75) Inventors: Yoshihiro Fujie, Kanagawa-ken (JP); Kenji Hidaka, Kanagawa-ken (JP); Shah Mohammad Rezaul Islam, Tucson, AZ (US); Robert A. Kubo, Tucson, AZ (US); Bret W. Lehman, Raleigh, NC (US); Robert M. Lindsay, Raleigh, NC (US); Gregg S. Lucas, Tucson, AZ (US); Jason A. Matteson, Raleigh, NC (US); Koji Nakase, Kanagawa (JP); Hirokazu Nishimura, Kanagawa-ken (JP); Kifumi Numata, Kanagawa-ken (JP); Michihiro Okamoto, Kanagawa-ken (JP); Tony C. Sass, Fuquay Varina, NC (US); Kenneth R. Schneebeli, San Jose, CA (US); Tohru Sumiyoshi, Kanagawa-ken (JP); Yoshihiko Terashita, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 11/263,207

(22) Filed: Oct. 31, 2005

(65) Prior Publication Data

US 2007/0097621 A1 May 3, 2007

(51) Int. Cl.
*G06F 1/20* (2006.01)
(52) U.S. Cl. .................. 361/679.37; 361/688; 361/692; 361/727

(58) Field of Classification Search ................. 361/687, 361/685, 679.37, 688, 727, 692; 312/223.2
See application file for complete search history.

(56) References Cited

U.S. PATENT DOCUMENTS

| | | | | |
|---|---|---|---|---|
| 5,191,544 | A * | 3/1993 | Benck et al. ................. | 361/688 |
| 5,673,172 | A * | 9/1997 | Hastings et al. ............. | 361/685 |
| 6,317,334 | B1 * | 11/2001 | Abruzzini et al. ........... | 361/797 |
| 6,473,297 | B1 * | 10/2002 | Behl et al. ................... | 361/685 |
| 6,512,678 | B2 * | 1/2003 | Sims et al. ................... | 361/759 |
| 6,532,150 | B2 * | 3/2003 | Sivertsen et al. ............ | 361/685 |
| 6,781,841 | B2 * | 8/2004 | Kim et al. .................... | 361/724 |
| 6,833,995 | B1 * | 12/2004 | Hsue et al. ................... | 361/727 |
| 6,882,525 | B2 * | 4/2005 | Paul et al. ............. | 361/679.37 |
| 6,975,510 | B1 * | 12/2005 | Robbins et al. ............. | 361/695 |
| 7,113,401 | B2 * | 9/2006 | Becker et al. ............... | 361/694 |
| 7,248,471 | B2 * | 7/2007 | Wabiszczewicz ........... | 361/694 |
| 2005/0122682 | A1 | 6/2005 | Streit et al. | |

OTHER PUBLICATIONS

China Patent & Trademark Office communication dated Jun. 5, 2009.

* cited by examiner

*Primary Examiner*—Jayprakash N Gandhi
*Assistant Examiner*—Ingrid Wright
(74) *Attorney, Agent, or Firm*—Quarles & Brady LLP

(57) ABSTRACT

A data storage library includes a drive enclosure bay which can be adapted to work with multiple air-flow configuration requirements. This is accomplished by creating air-flow ports in the top and bottom of the drive enclosure bay, by forming drive tray slots and printed circuit board ports in associated drive trays, by creating frame ports and PCB notches in associated interface cards, and replacing traditional connectors with slimmer but longer connectors that provide additional standoff and improved air-flow.

21 Claims, 8 Drawing Sheets

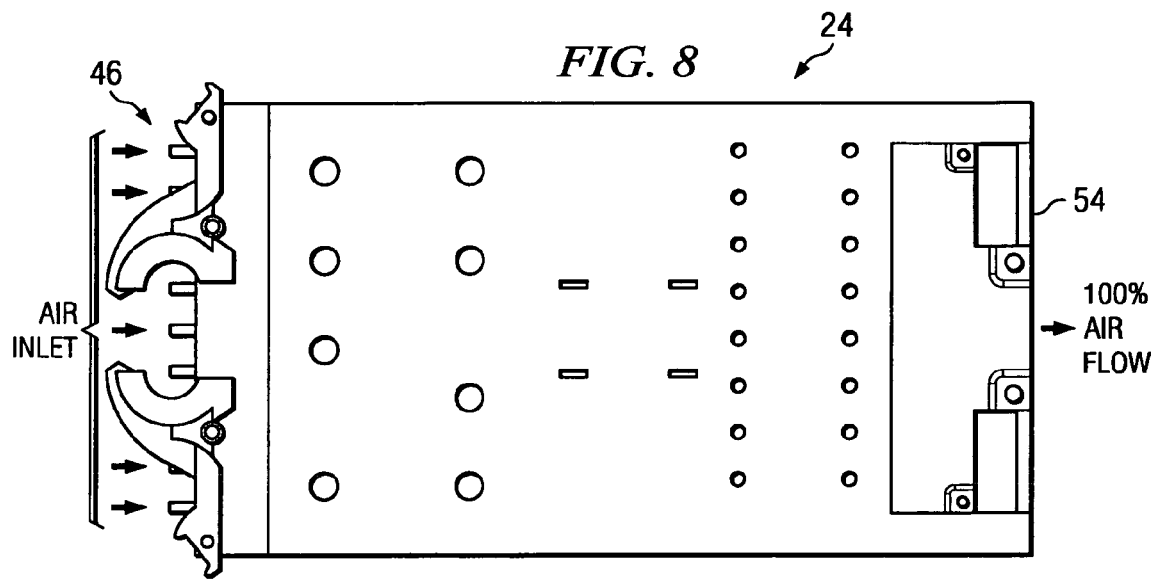
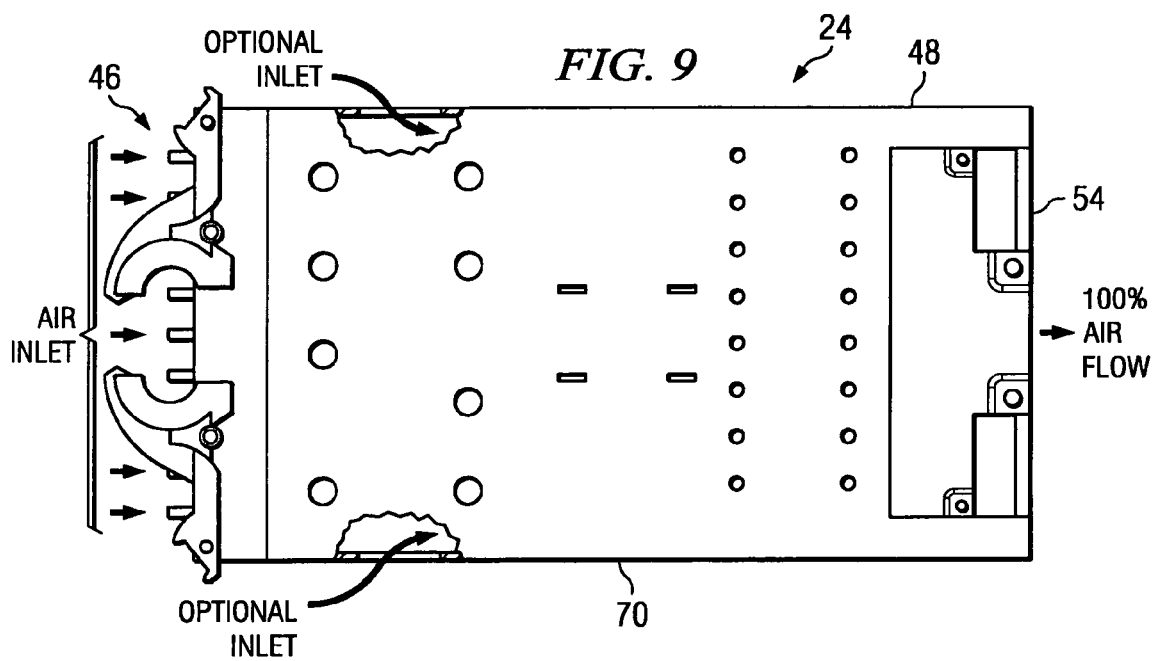

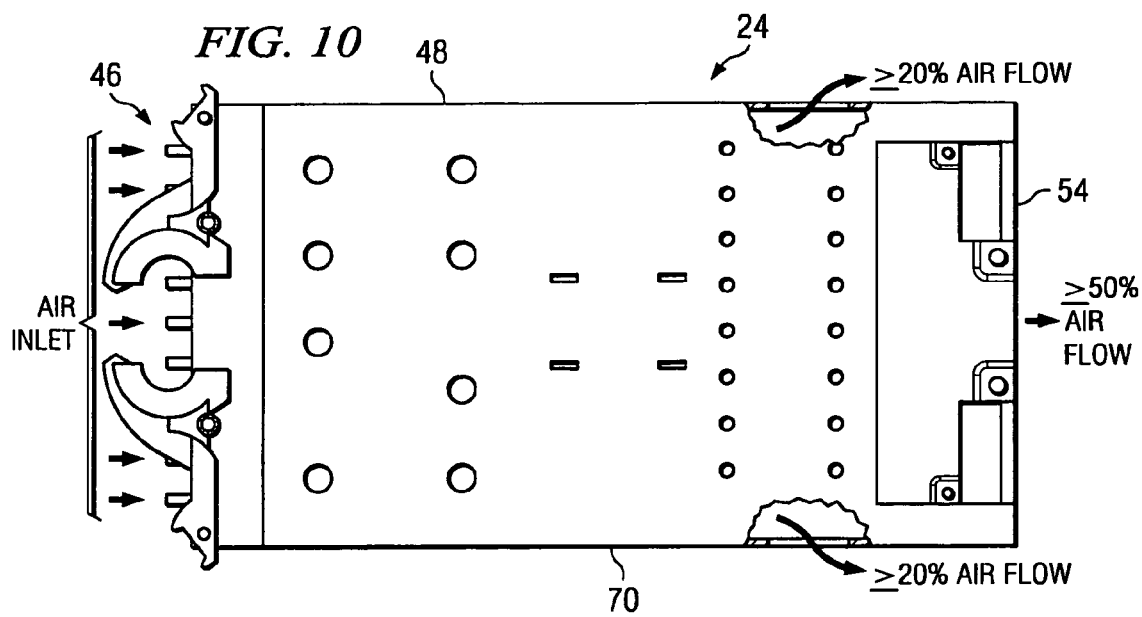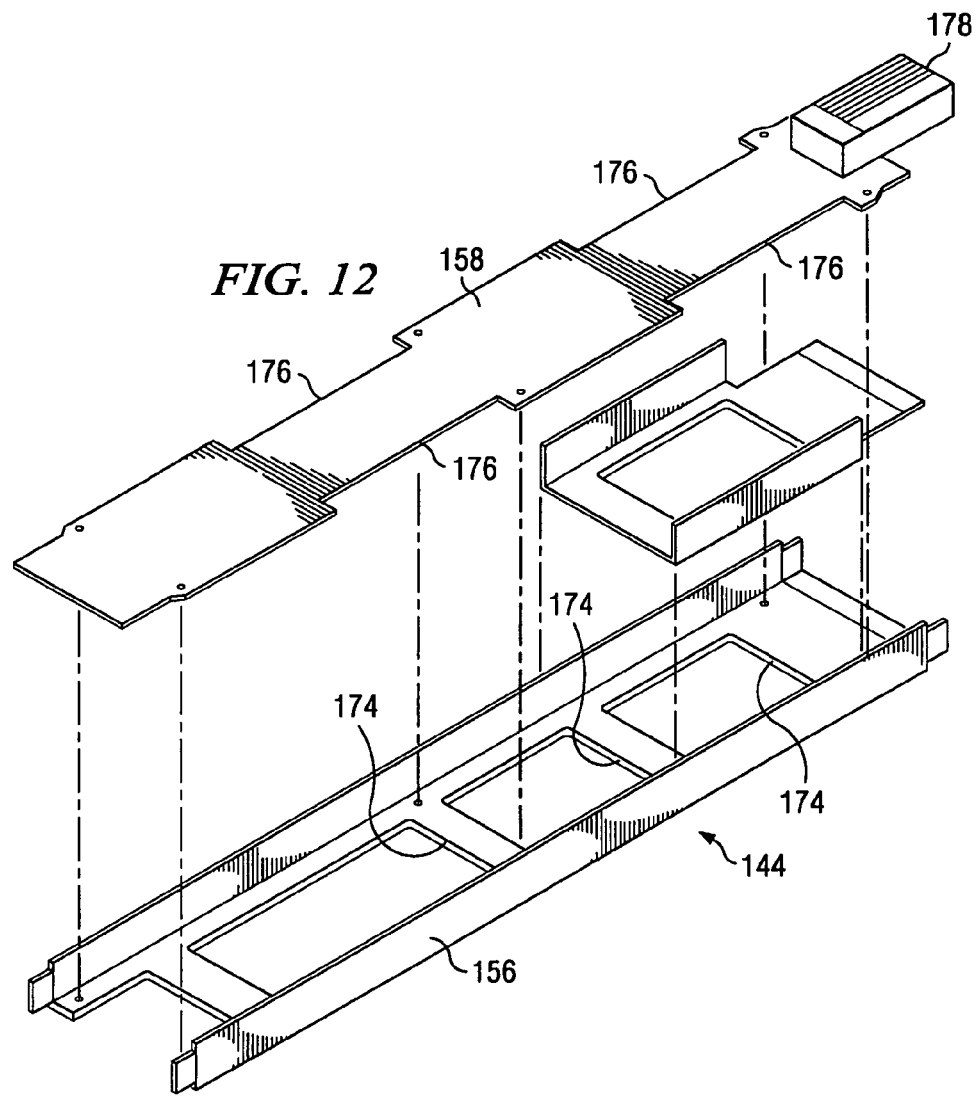

AIR DISTRIBUTION SYSTEM COMPATIBLE WITH DISPARATE DATA STORAGE SYSTEMS

BACKGROUND OF THE INVENTION

1. Field of the Invention

This invention is related in general to the field of data management systems. In particular, the invention consists of a system for distributing air through a drive enclosure bay residing within one of multiple disparate data storage systems.

2. Description of the Prior Art

Data storage libraries are used for providing cost effective storage and retrieval of large quantities of data. In a data storage library, data is stored on data storage media that are, in turn, stored on storage shelves or on racks inside the library in a fashion that renders the media, and its resident data, accessible. Data storage media may comprise any type of media on which data may be stored, including but not limited to magnetic media (such as magnetic tape or disks), optical media (such as optical tap or disks), electronic media (such as PROM, EEPROM, flash PROM, Compactflash™, Smartmedia™ Memory Stick™, etc.), or other suitable media.

An exemplary data storage library may include a plurality of disparate components such as a power supply, a control module, an interconnect device, one or more communication devices, a blower module for removing heat, and one or more slots for receiving interchangeable components. These interchangeable components may include drive enclosure bays each containing multiple drive trays.

Each drive tray may, in turn, hold several data storage devices such as hard-disk drives, tape cartridges, optical-disk drives, or the like. These types of data storage devices traditionally operate by spinning a data storage media, such as a platter or disk, over a read/write head.

A primary concern for data storage systems is the displacement of heat generated by its components. To this end, the blower module usually includes a fan and, optionally, a refrigeration unit or cooler. The purpose of the fan may be to pull air into the data storage system in a manner that draws it over heated components, absorbing heat from these components, and discharging the heated air from the data storage unit. Alternatively, the fan may pull air into the data storage system, pass it over a cooler or refrigeration unit to lower its temperature, and then force it through and around heated system components. Either way, the cooling system requires that relatively cool air pass over, through, and around the heated components in sufficient quantities to remove an acceptable amount of heat from these components.

A primary source of heat in a traditional data storage system is the plurality of data storage devices placed on the drive trays of the drive enclosure bays. Accordingly, a traditional drive enclosure bay is designed to meet the needs of its attendant data storage system. For example, a drive enclosure bay designed for a first data storage system may provide a specific air-flow path entering the data storage system enclosure, over and around the drive trays containing data storage devices, through the blower, and exiting the blower module. Traditionally, a drive enclosure bay designed for a second data storage system may provide a much different air-flow path, as the design of its enclosure, power module, blower module, and other components may be different than that of the first data storage system. Another consideration may be the required air-flow impedance of each data storage system. For these reason, drive enclosure bays are traditionally designed for a specific data storage system. However, this prevents a drive enclosure bay from being ported from one type of data storage system to another. This, in turn, reduces flexibility in the transferal of data storage devices from one system to another. Accordingly, it is desirable to have a system for distributing air through a drive enclosure bay wherein the drive enclosure bay may reside in one of a plurality of disparate data storage systems.

SUMMARY OF THE INVENTION

The invention disclosed herein employs a plurality of airflow paths within a drive enclosure bay to allow the drive enclosure bay to function with multiple disparate data storage systems. Another aspect of the invention is the use of narrow and offset connectors to facilitate the flow of air through the drive enclosure bay. The drive tray includes a front side adapted to allow air to flow through the front side of the drive enclosure bay, a top side including an air outlet port, a bottom side including an air outlet port, and a rear side including a contoured stiffener adapted to allow air to flow through the rear side of the drive enclosure bay. Additional features include the use of PCB ports and drive tray slots in the drive tray and frame ports and PCB notches in interface cards within the drive enclosure bay.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

BRIEF DESCRIPTION OF THE DRAWINGS

FIG. 8 is a block diagram of a first data storage library air-flow configuration, according to the invention.

FIG. 9 is a block diagram illustrating an optional embodiment of the first data storage library air-flow configuration of FIG. 8.

FIG. 10 is a block diagram of a second data storage library air-flow configuration, according to the invention.

FIG. 12 is an isometric view of an improved interface card, according to the invention.

DESCRIPTION OF THE PREFERRED EMBODIMENTS

Figure 1:
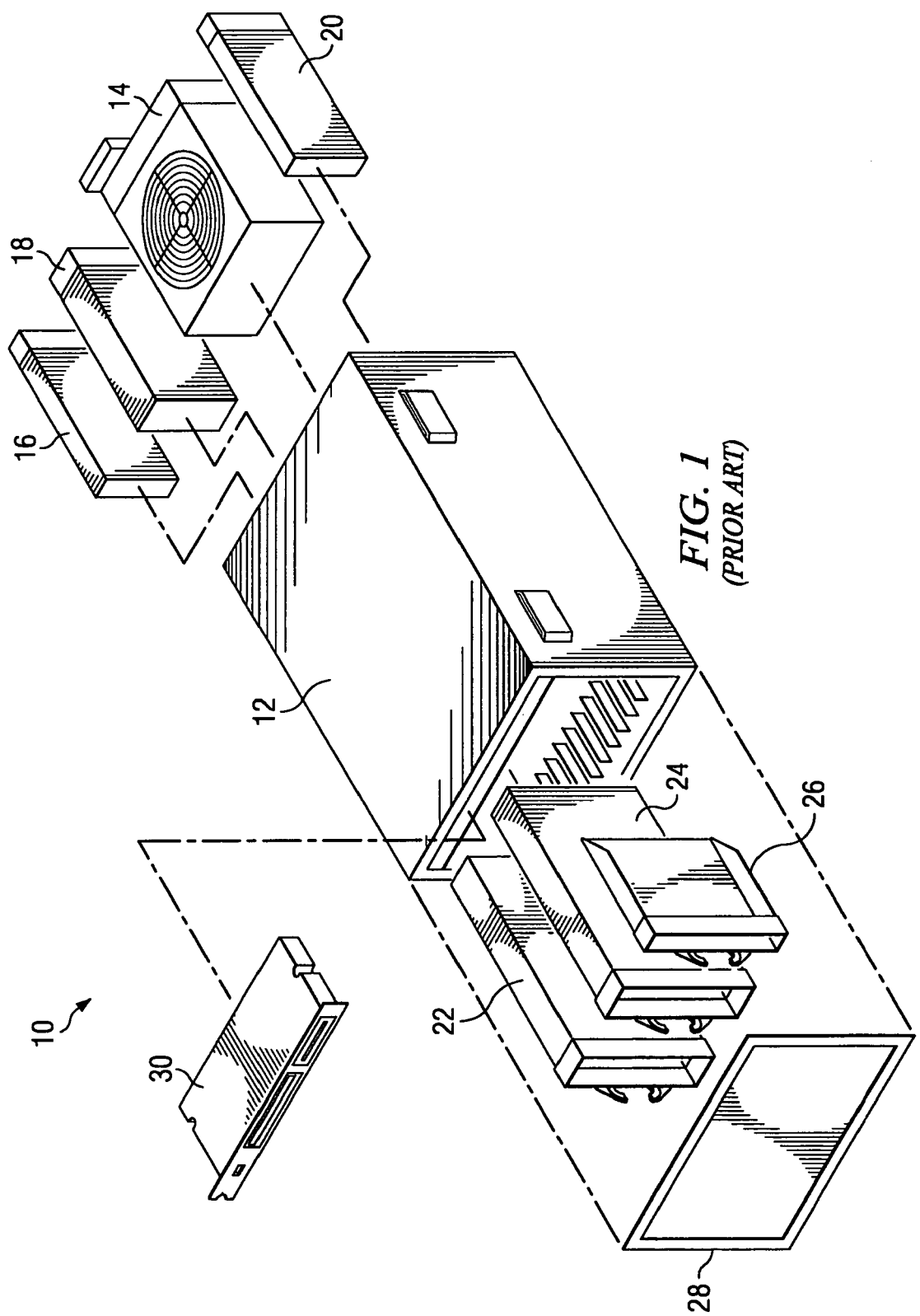
FIG. 1 is an exploded view illustrating a data storage library including a housing, a blower module, and a plurality of data storage device enclosures, according to the invention.
Figure 2:
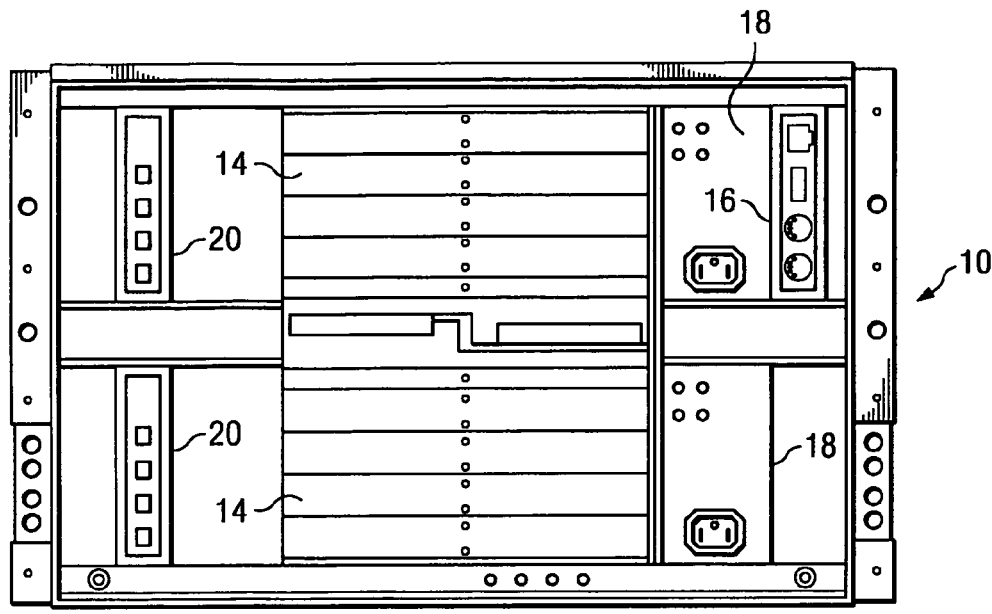
FIG. 2 is a rear view of the data storage library of FIG. 1, more fully illustrating some of its major components.

This invention is based on the idea of using a plurality of air-flow paths within a drive enclosure bay to allow the drive enclosure bay to function with multiple disparate data storage systems. Referring to figures, wherein like parts are designated with the same reference numerals and symbols, FIG. 1 is an exploded view illustrating a first data storage system 10 including a housing 12, a blower module 14, a management module 16, a power module 18, a switch module 20, a blade server 22, a drive enclosure bay 24, a filler blade 26, a front bezel 28, and a media tray 30 containing a CD-ROM drive, a USB port, and a diskette drive. FIG. 2 is a rear view of the data storage library 10 of FIG. 1, more fully illustrating the arrangement of the switch modules 20, the blower modules 14, the power modules 18, and the management module 16.

Figure 3:
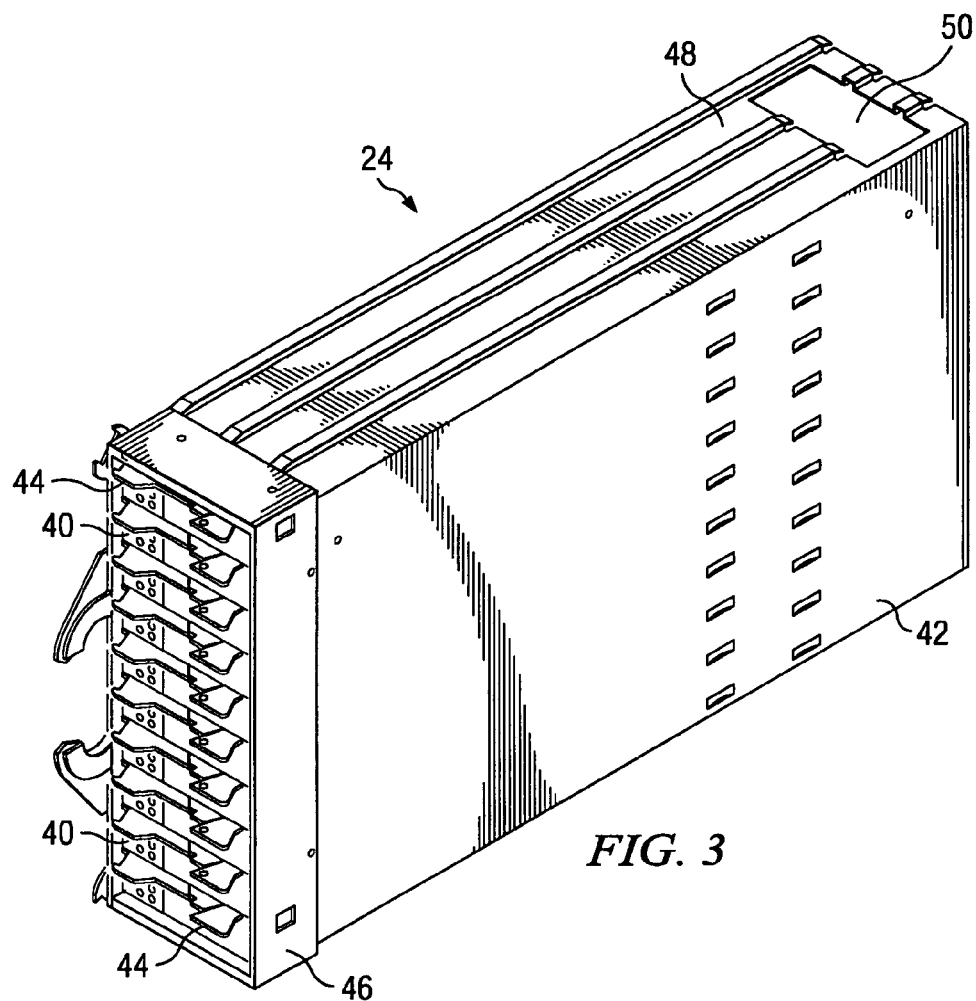
FIG. 3 is an isometric view of a drive enclosure bay including drive trays containing data storage devices and interface cards, according to the invention.
Figure 4:
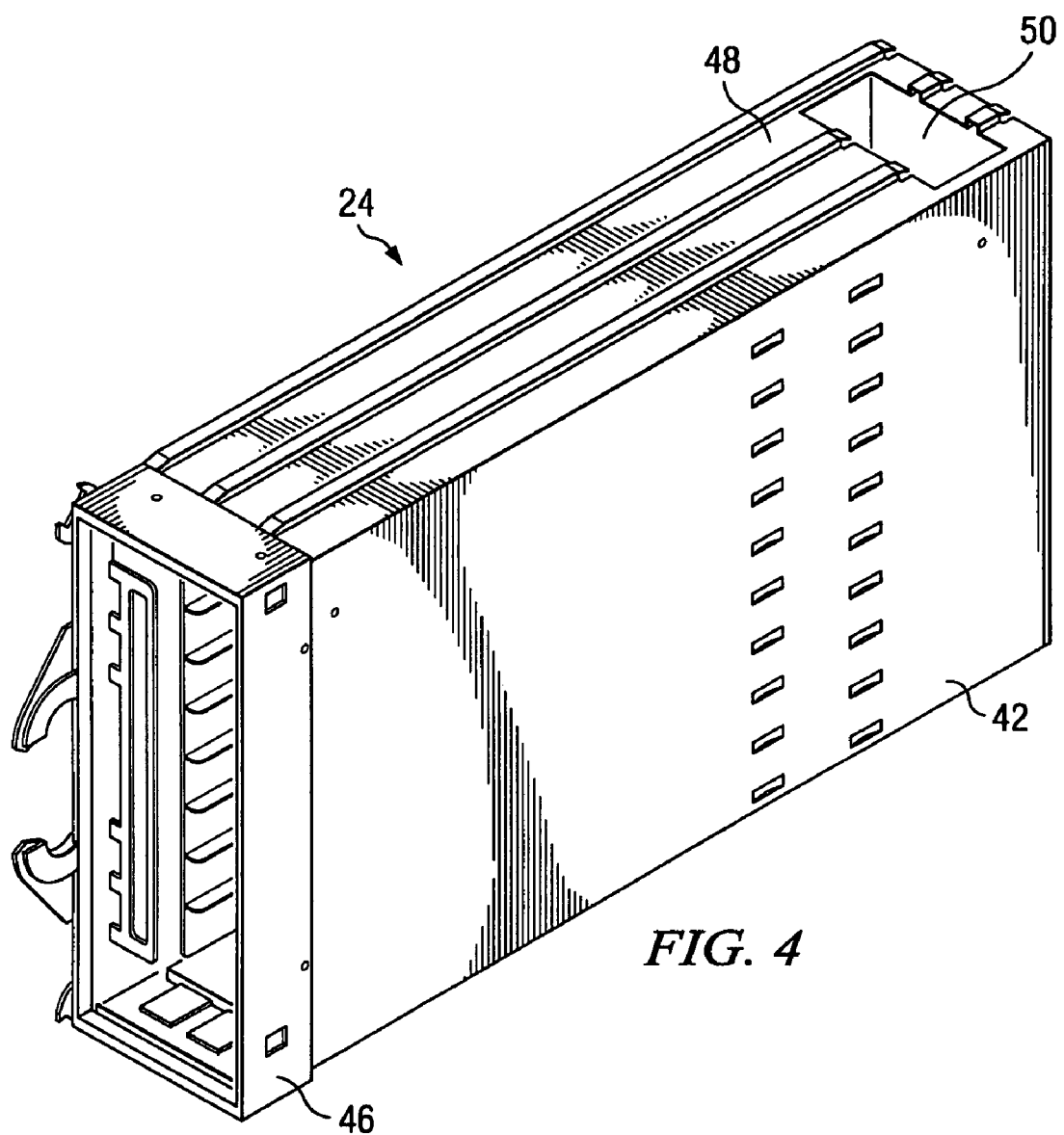
FIG. 4 is an isometric view of the drive enclosure bay of FIG. 3 absent the drive trays and interface cards.

FIG. 3 is an isometric view of the drive enclosure bay 24 introduced in FIG. 1, including drive trays 40 containing data storage devices and interface cards 44. The drive enclosure bay 24 includes a front side 46 through which the drive trays 40 and interface cards 44 are inserted, a top side 48, a right side 42, a bottom side (not shown), a left side (not shown), and a rear side (not shown). In this embodiment of the invention, an air outlet portal 50 is placed toward the rear of the top side 48 and the rear of bottom side (not shown). This air outlet portal 50 allows air to flow from the drive enclosure bay 24 into the enclosure 12 of the data storage library 10, when configured in one of at least two different configurations. FIG. 4 illustrates the drive enclosure bay 24 of FIG. 3 without the drive trays and interface cards.

Figure 5:
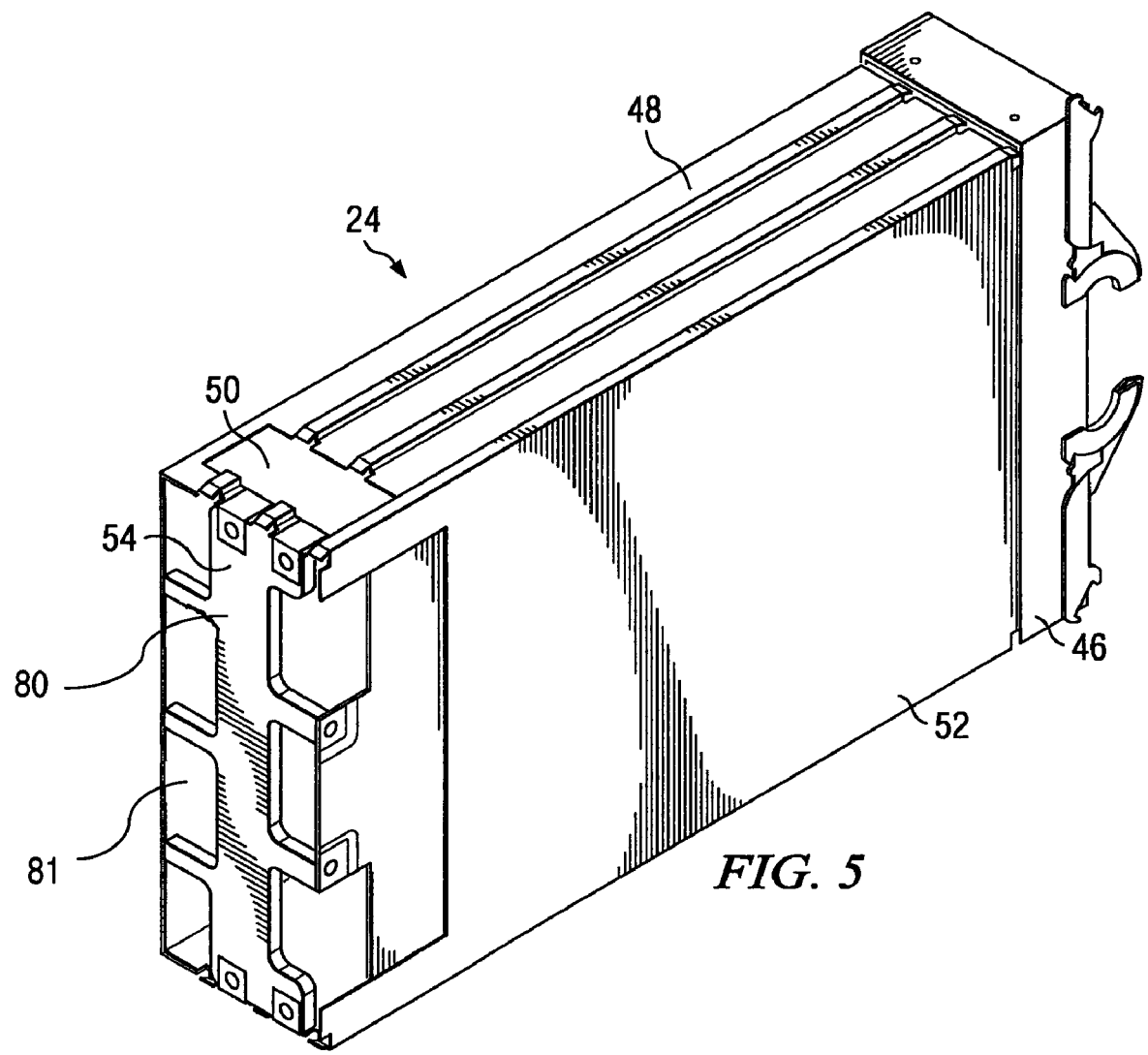
FIG. 5 is an isometric view of the rear side of the drive enclosure bay of FIG. 4.

The isometric view of FIG. 5 illustrates the left side 52, the top side 48, the rear side 54, the front 46, and the air outlet portal 50 of the drive enclosure bay 24 of FIG. 4. In this embodiment of the invention, the rear 54 of the drive enclosure bay 24 includes a drive enclosure bay mid-plane 80. One aspect of this invention is that the mid-plane 80 is contoured in a manner designed to allow air-flow from the rear of the drive enclosure bay 24 into the housing 12 of the data storage library. This is accomplished via multiple cut-outs 81, rather than using a traditional full rear enclosure of a traditional drive enclosure bay.

Figure 6:
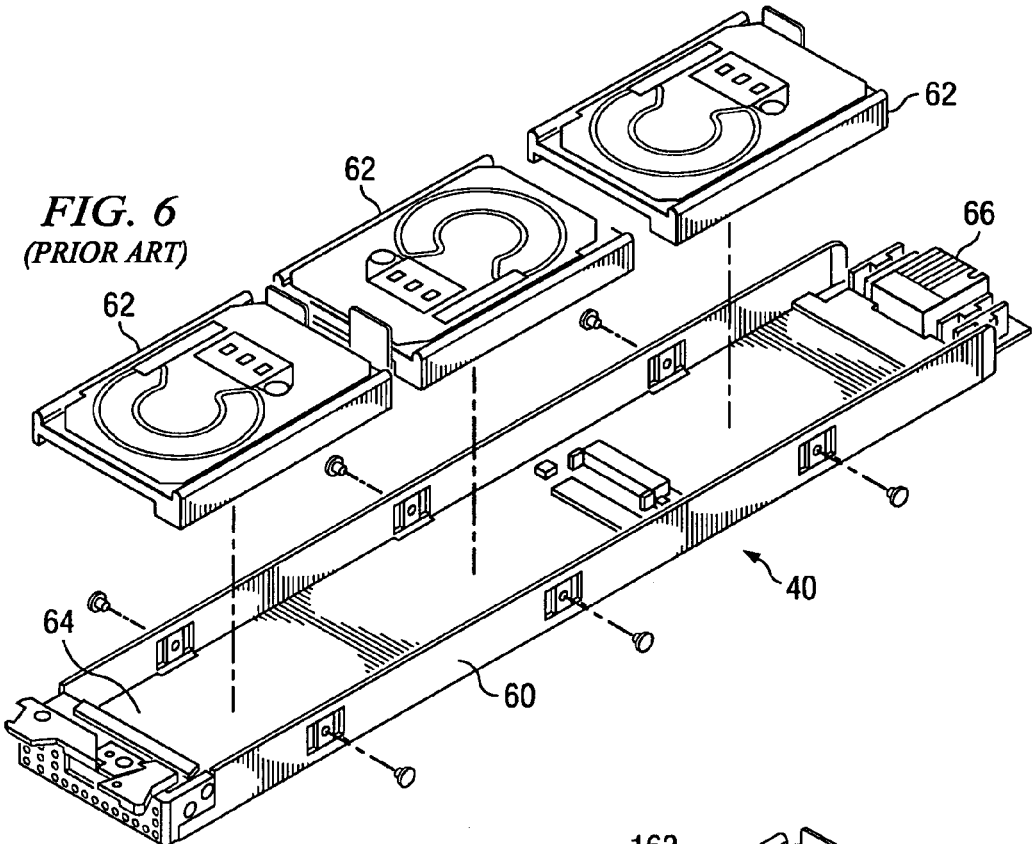
FIG. 6 is an isometric view of a traditional drive tray of FIG. 3 including data storage devices, a solid sheet printed circuit board, a solid bottomed frame, and a traditional connector.
Figure 7:
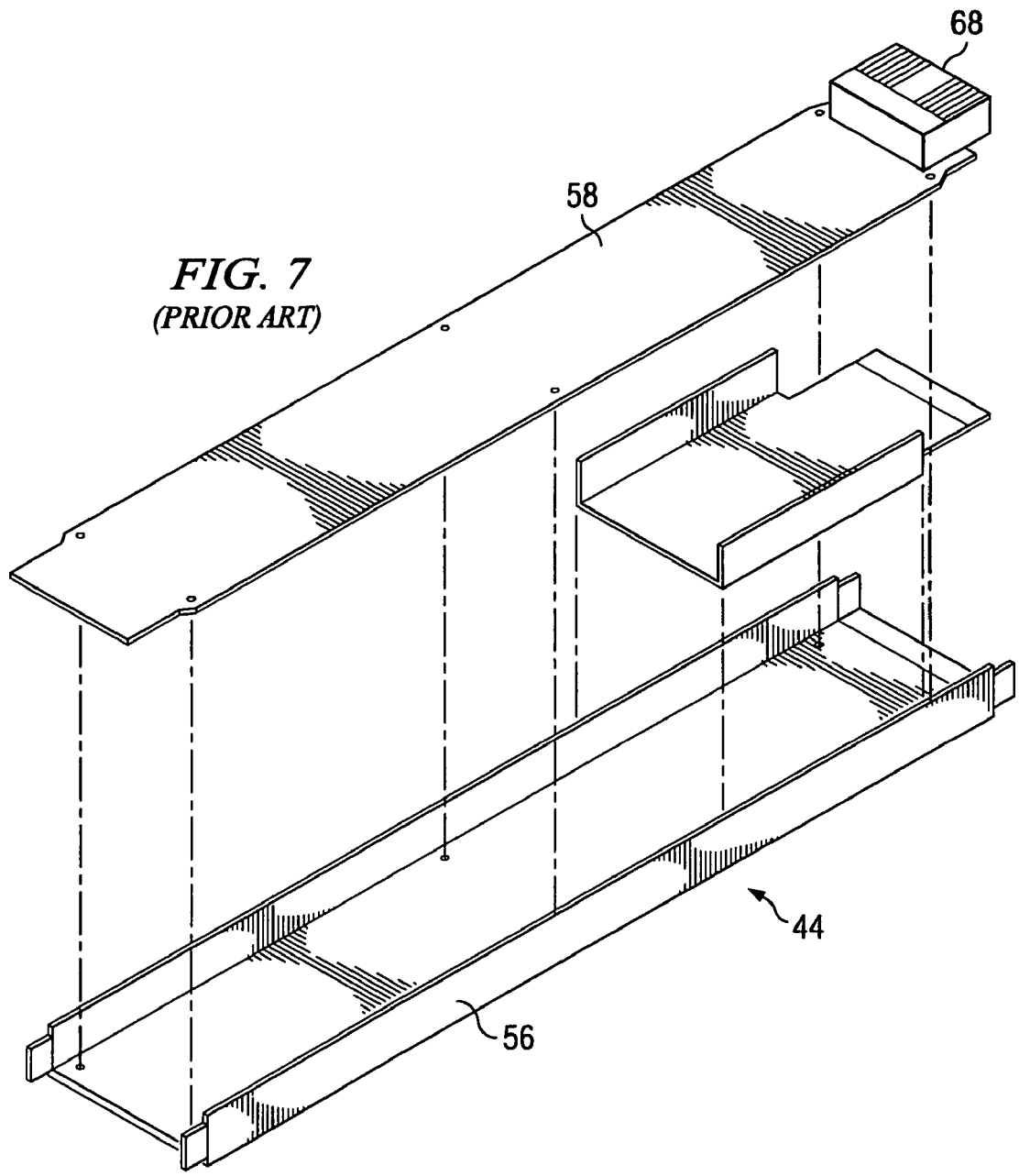
FIG. 7 is an isometric view of a traditional interface card of FIG. 3 including a solid sheet printed circuit board, a solid bottomed frame, and a traditional connector.

The isometric drawing of FIG. 6 illustrates a traditional drive tray 40 including a sheet metal frame 60, one or more data storage devices 62, a printed circuit board 64 and a traditional connector 66. The isometric drawing of FIG. 7 illustrates a traditional interface card 44 including a sheet metal frame 56, a PCB board 58, and a traditional connector 68 which is approximately the same width as the PCB board 58.

One aspect of this invention is the requirement that the drive enclosure bay 24 provide sufficient air flow through the drive enclosure bay 24 into the housing 12 of whatever type of data storage library 10 it is inserted into. In a first configuration, as illustrated by the block diagram of FIG. 8, 100% of air flow enters the drive enclosure bay from the front 46 and exits from the rear 54. The block diagram of FIG. 9 illustrates an optional implementation of this first configuration, with air intake being divided between the front 46, top 48, and bottom 70 of the drive enclosure bay 24.

In a second configuration, as illustrated by the block diagram of FIG. 10, 100% of the air enters the drive enclosure bay from the front 46 but exits via multiple paths, i.e., at least 20% from both the top 48 and bottom 70 and at least 50% from the rear 54. To accommodate these disparate system configuration requirements, numerous design changes must be implemented in the drive trays 40 (FIG. 6), the interface cards 44 (FIG. 7), the top 48, the bottom 70, and the rear side 54 of the drive enclosure bay 24.

As previously indicated and illustrated in FIG. 5, the rear enclosure of the drive enclosure bay 24, while traditionally a solid sheet covering the entire rear 54 of the drive enclosure bay 24, has been replaced with a mid-plane stiffener 80 which has been contoured so as to allow air to flow through. This helps facilitate the air flow requirements of both the first configuration (FIGS. 8 and 9) and the second configuration (FIG. 10).

Figure 11:
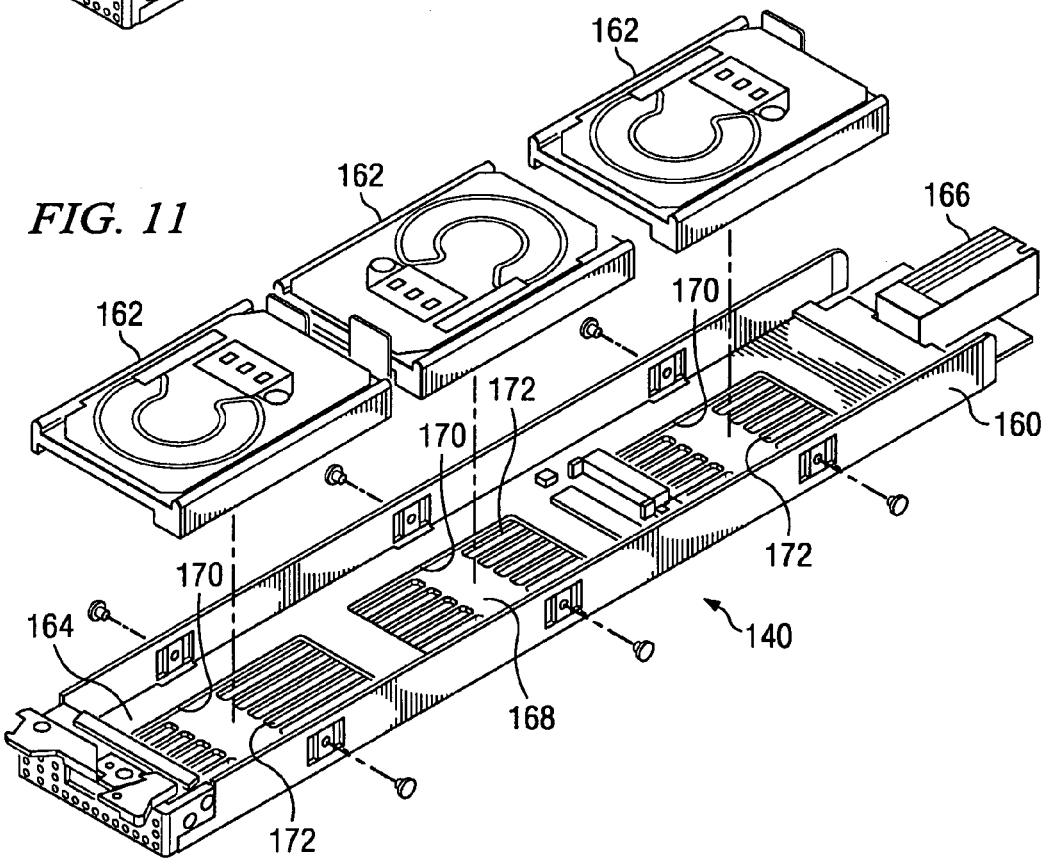
FIG. 11 is an isometric view of an improved drive tray, according to the invention.

An improved drive tray 140 is illustrated in the isometric view of FIG. 11. Here, data storage devices 162 consisting of hard disk drives are attached to a PCB 164 and sheet metal frame 160. In order to facilitate the flow of air between the data storage devices 162, the PCB 164, and the frame 160 of the drive tray 140, a plurality of PCB ports 170 have been formed in the PCB 164, a plurality of tray slots 172 have been formed in the bottom 168 of the frame 160, and these PCB ports 170 and tray slots 172 have been staggered. This allows air to pass over, around, and under the data storage devices, through the PCB ports 170, and through the tray slots 172. Another aspect of the invention is that the traditional connector 66 (FIG. 6) has been replaced with a slimmer but longer and taller connector 166 which allows more air to flow towards the rear 54 of the drive enclosure bay 24.

An improved interface card 144 is illustrated in the isometric drawing of FIG. 12. Here, a sheet metal frame 156 includes a plurality of frame ports 174, referred to herein as interface card air-flow ports. The PCB 158 includes a plurality of PCB notches 176, referred to herein as printed circuit board air-flow ports, which are staggered with respect to the frame ports 174. The traditional connector 68 (FIG. 7) has been replaced with a slimmer but longer and taller connector 178 which allows air to flow through the interface card 144 toward the rear 54 of the drive enclosure bay 24. The staggered frame ports 174 and PCB notches 176 allow air to flow through the bottom of the improved interface card 144.

Those skilled in the art of making data storage systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A drive enclosure bay, comprising:
   a front side adapted to allow the insertion of drive trays and interface cards into the drive enclosure bay, the front side further adapted to allow air to flow through the front side of the drive enclosure bay;
   top side including an air outlet port;
   a bottom side including an air outlet port;
   a first and second lateral sides disposed substantially perpendicularly to said top side and said bottom side;
   a rear side opposite said front side, including a stiffener, wherein the stiffener comprises a vertical member disposed along a centerline of said rear side, and a plurality of co-parallel lateral members attached to and extending outwardly from said vertical member in a plane of said rear side and attached to either of said first or said second lateral sides;

wherein the plurality of lateral members, said vertical member, and said first and second lateral sides are arranged to define a plurality of contoured cut-outs in said rear side, wherein the plurality of contoured cutouts are adapted to allow air to flow through the rear side of the drive enclosure bay, and wherein the drive bay enclosure has a long axis parallel to the longest dimension of the drive bay enclosure, and the front side and rear side are adapted to provide a straight-line air-flow path that runs substantially parallel to said long axis.

2. The drive enclosure bay of claim 1, further comprising a drive tray including a drive tray printed circuit board, a drive tray frame, a drive tray bottom, a drive tray rear side, and a drive tray connector, wherein the drive tray connector is adapted to allow air to flow through the drive tray rear side.

3. The drive enclosure bay of claim 2, wherein the drive tray printed circuit board includes a drive tray printed circuit board air-flow port adapted to allow air to flow through the drive tray printed circuit board.

4. The drive enclosure bay of claim 3, wherein the drive tray bottom includes a drive tray air-flow port adapted to allow air to flow through the drive tray bottom.

5. The drive enclosure bay of claim 4, wherein the drive tray air-flow port and the drive tray printed circuit board air-flow port are staggered.

6. The drive enclosure bay of claim 2, wherein the drive tray bottom includes a drive tray air-flow port adapted to allow air to flow through the drive tray bottom.

7. The drive enclosure bay of claim 1, further comprising an interface card including an interface card printed circuit board, an interface card frame, an interface card bottom, an interface card rear side, and an interface card connector, wherein the interface card connector is adapted to allow air to flow through the interface card rear side.

8. The drive enclosure bay of claim 7, wherein the interface card printed circuit board includes an interface card printed circuit board air-flow port adapted to allow air to flow through the interface card printed circuit board.

9. The drive enclosure bay of claim 8, wherein the interface card bottom includes an interface card air-flow port adapted to allow air to flow through the interface card bottom.

10. The drive enclosure bay of claim 9, wherein the interface card air-flow port and the interface card printed circuit board air-flow port are staggered.

11. The drive enclosure bay of claim 7, wherein the interface card bottom includes an interface card air-flow port adapted to allow air to flow through the interface card bottom.

12. The drive enclosure bay of claim 1, wherein said front side is adapted to accept substantially 100% of the air flow required to cool said drive trays and interface cards, and wherein said rear side is adapted to pass substantially 100% of the air flow required to cool said drive trays and interface cards.

13. The drive enclosure bay of claim 1, wherein said front side is adapted to accept substantially 100% of the air flow required to cool said drive trays and interface cards, wherein said rear side is adapted to pass at least 50% of the air flow required to cool said drive trays and interface cards, and wherein said top and bottom sides are each adapted to pass at least 20% of the air flow required to cool said drive trays and interface cards.

14. A data storage system, comprising:
a blower; and
a drive enclosure bay including a front side adapted to allow the insertion of drive trays and interface cards into the drive enclosure bay, the front side further adapted to allow air to flow through the drive enclosure bay, a top side including an air outlet port, a bottom side including an air outlet port, and a rear side opposite said front side,
wherein, said rear side comprises a vertical member disposed along a centerline of said rear side, and a plurality of co-parallel lateral members attached to and extending outwardly from said vertical member in a plane of said rear side and attached to either of a first or said second lateral sides,
wherein, the plurality of lateral members, said vertical member, and said first and second lateral sides are arranged to define a plurality of contoured cut-outs in said rear side, wherein the plurality of contoured cutouts are adapted to allow air to flow through the rear side of the drive enclosure bay,
and wherein the drive enclosure bay has a long axis parallel to the longest dimension of the drive bay enclosure, and the front side and rear side are adapted to provide a straight-line air-flow path that runs substantially parallel to said long axis.

15. The data storage system of claim 14, wherein the drive enclosure bay further comprises a drive tray including a drive tray printed circuit board, a drive tray frame, a drive tray bottom, a drive tray rear side, and a drive tray connector, and wherein the drive tray connector is adapted to allow air to flow through the drive tray rear side.

16. The data storage system of claim 15, wherein the drive tray printed circuit board includes a drive tray printed circuit board air-flow port adapted to allow air to flow through the drive tray printed circuit board.

17. The data storage system of claim 16, wherein the drive tray bottom includes a drive tray air-flow port adapted to allow air to flow through the drive tray bottom.

18. The data storage system of claim 15, wherein the drive tray bottom includes a drive tray air-flow port adapted to allow air to flow through the drive tray bottom.

19. The data storage system of claim 14, wherein the drive enclosure bay further comprises an interface card including an interface card printed circuit board, an interface card frame, an interface card bottom, an interface card rear side, and an interface card connector, and wherein the interface card connector is adapted to allow air to flow through the interface card rear side.

20. The data storage system of claim 19, wherein the interface card printed circuit board includes an interface card printed circuit board air-flow port adapted to allow air to flow through the interface card printed circuit board.

21. The data storage system of claim 20, wherein the interface card bottom includes an interface card air-flow port adapted to allow air to flow through the interface card bottom.

* * * * *